United States Patent [19]

Nakao

[11] Patent Number: 4,854,647
[45] Date of Patent: Aug. 8, 1989

[54] AUTOMATIC AIR BRAKE SYSTEMS WITH ACCELERATED EXHAUSTION OF THE BRAKE LINE

[75] Inventor: Yasuo Nakao, Kobe, Japan

[73] Assignee: Nippon Air Brake Co., Ltd., Kobe, Japan

[21] Appl. No.: 210,545

[22] Filed: Jun. 23, 1988

[30] Foreign Application Priority Data

Jul. 15, 1987 [JP] Japan .................... 62-176515

[51] Int. Cl.⁴ .................................... B60T 15/52
[52] U.S. Cl. ............................ 303/69; 303/81
[58] Field of Search ............... 303/37, 38, 20, 47, 303/69, 81, 82, 83

[56] References Cited

U.S. PATENT DOCUMENTS

| | | | |
|---|---|---|---|
| 3,966,269 | 6/1976 | McEathron | 303/37 |
| 4,145,090 | 3/1979 | Hart | 303/37 |
| 4,449,759 | 5/1984 | Eder | 303/38 |
| 4,679,863 | 9/1987 | Ikeda et al. | 303/81 X |

Primary Examiner—Duane A. Reger
Attorney, Agent, or Firm—J. B. Sotak

[57] ABSTRACT

An automatic air brake system for accelerating the exhaustion of the pressure in the brake line of a train for more rapidly applying the brakes on all the railway vehicles. A flow rate detector connected to the brake line of the locomotive to detect the flow of air in the brake line. A pilot chamber of a relay valve is supplemented when a flow signal from the flow rate detector exceeds a predetermined value and the supplementation is stopped when the flow rate drops below a predetermined value. The pilot chamber is exhausted in response to a brake application command and is pressurized in response to a brake release command. The relay valve includes an output chamber which is connected to the brake line of the locomotive, and the brake line pressurizes and exhausts the output chamber in response to the pressurization and exhaustion of the pilot chamber.

7 Claims, 4 Drawing Sheets

AUTOMATIC AIR BRAKE SYSTEMS WITH ACCELERATED EXHAUSTION OF THE BRAKE LINE

FIELD OF THE INVENTION

This invention relates to automatic air brake systems which is used in a railway train consisting of a locomotive and a plurality of connected freight cars which are pulled by the locomotive, and in which the brake line runs through the length of the train. The brake line is pressurized and exhausted by the relay valve located in the locomotive. In other words, during normal running operation, the compressed air is supplied by the relay valve in the locomotive to the brake line of each freight car. The compressed air is built up to a specified or preselected pressure, and it is maintained at this level so that the brakes of each freight car are moved to their released state. Now, when a braking command is initiated, the brake line of each car is exhausted and depressurized by the relay valve in the locomotive so that the brakes are operated in proportion to the amount of depressurization. The particular invention is related to an automatic air brake system which employs an improved air exhaust operation.

BACKGROUND OF THE INVENTION

There are a number of prior art automatic air brake systems, one of which is disclosed in NABUKO GIHOO, No. 63, published on Jan. 1, 1987. An exemplified embodiment of a prior art system is illustrated in FIG. 7 of the drawings, and will be presently explained in the specification of the subject application.

In viewing FIG. 7, it will be appreciated that the system is shown in a brake released condition.

At this time, the brake valve BV3 is moved to the running position and a balance discharge valve inside the valve is in a closed position. Thus, the balance air reservoir ER and the pilot chamber A of the relay valve RV3 are pressurized to a specific pressure level and are maintained at the specified pressure, such as, 5 Kg/cm$^2$.

In addition, the controller CB3 switches the electromagnetic valve MV3 to an OFF condition since the status signal S from the brake valve BV3 is equal to zero (0). Therefore, the electromagnetic valve MV3 is in a first exhaust position $\tau$ so that the expansion air reservoir BR is opened to the atmosphere.

Further, the relay valve RV3 assumes a lapped position in which the pressure pilot chamber A is maintained at a specified pressure so that the output chamber B and the brake line BP are maintained at a specified pressure, and the air supply valve D is seated on the hollow exhaust valve rod C and is also seated on the air supply valve seat E. Thus, the output chamber B is closed off from the air supply chamber F and the exhaust chamber G. Thus, the forces pushing on the balance piston H from the up and down directions, as shown in FIG. 7, are balanced or equalized.

Since the pressure in the brake line BP is maintained at a specified pressure by the brake valve BV3 and the relay valve RV3, the brake control valve CV of the lead unit or locomotive and the pressure of the brake control valves of the following freight cars are exhausting. However, the pressure in the supplemental air reservoir AR is maintained at a certain pressure, and the brake cylinder BC is opened to the atmosphere via the exhausting hole Ex. The brake control vale CV may be a conventional two-pressure type of control valve or a conventional three-pressure type of control valve and, therefore, detailed explanations are omitted for the sake of convenience.

In the normal running mode, as shown in FIG. 7, the brake valve BV3 is placed into the normal brake position so that the balance air reservoir ER is exhausted by the brake valve BV3. The balance discharge valve (not shown) in the brake valve BV3 opens and exhausts the brake line BP to atmosphere. Simultaneously, the relay valve RV3 exhausts the brake line BP to atmosphere.

During this normal brake action, the pressure in the balance air reservoir ER is higher than a predetermined pressure, e.g., 4.8 Kg/cm$^2$, and also the condition signal S from the brake valve BV3 switches to a position in which is equal to S=1 so that the commander CB3 switches the electromagnetic valve MV3 to the ON condition, namely, the second position $\square$.

Therefore, the compressed air in the balance air reservoir ER flows into the expansion air reservoir BR. Thus, the balance air reservoir ER is partly exhausted in the early stage of normal braking so that the balance discharge valve (not shown) in the brake valve BV3 and the balance piston H of the relay valve RV3 definitely start to operate early and the exhaustion of the brake line BP begins early.

When the pressure in the balance air reservoir ER becomes lower than the above-mentioned predetermined pressure, namely, 4.8 Kg/m$^2$, the controller CB3 switches the electromagnetic valve MV3 to its OFF position so that it returns to the first position $\tau$. However, the balance air reservoir ER is still being continuously exhausted by the brake valve BV3.

Accompanying this exhaustion of the balance air reservoir ER, the pilot chamber A of the relay valve RV3 is also exhausted so that the force pushing the balance piston H upward becomes smaller than the force pushing it downward so that the balance piston H moves downwardly. Thus, the exhaust valve rod C, which is part of the piston, moves downward and unseats from the air supply valve D. Accordingly, the brake line BP is open to the atmosphere via output chamber B, exhaust valve rod C, and through exhaust chamber G. This is called exhaust operation.

Because of this exhaustion of the brake line BP, the brake control valve CV in each railway car initiates an air supply action and causes the closure of exhaust opening EX. At the same time, air is supplied from the supplemental air reservoir AR to the brake cylinder BC.

After the balance air reservoir ER is exhausted a certain amount by the brake valve BV3, the brake valve BV3 is moved into the lap position (not shown). Thus, the exhaustion by the internal balance discharge valve ceases and the balance air reservoir ER maintains the existing pressure at the time. Simultaneously, the relay valve RV3 returns to the lap state, as shown in FIG. 7. Thus, the brake line maintains the existing pressure at that time, and each railway car maintains the braking operation at that time. During this time, the status signal S is equal to zero (0).

In this brake maintenance state, if the brake valve BV3 is moved into the running released position, the balance air reservoir ER is pressurized to a certain pressure. Accompanying this, the pilot chamber A of the relay valve RV3 is pressurized so that the balance piston H and the exhaust valve rod C are moved upwardly. This causes the air supply valve D to be unseated from the air supply valve seat E, and the air is supplied from the original air reservoir line MRP to the brake line BP through the air supply chamber F and the output chamber B. This is called the air supply operation. When the force pushing the balance piston downwardly increases by the pressurization of the output chamber B, and when the output chamber B reaches a certain pressure, the relay valve RV3 returns to the lap state or position, as shown in FIG. 7.

In the above-described embodiment of the prior art arrangement, if the train is long, i.e., if a great number of cars are connected to the train, the exhaustion from the locomotive by the brake line BP is unduly delayed due to the slow speed of the transmission of the air caused by the resistance in the brake line BP. Thus, the exhaustion state of the brake line BP in the last railway car of the train is delayed in comparison with that of the locomotive. When the brake line BP in the locomotive has already reached a predetermined exhaustion, the brake line of the last car is not yet exhausted to that amount. It will be seen that the brake valve BV3 and the relay valve RV3 impede the exhaust capacity. Consequently, the exhaustion of the brake line BP of the last car is delayed even further.

In other words, when the brake line valve BV3 is in the normal brake position, the balance air reservoir ER is being exhausted. Thus, a pressure difference is generated between the brake line BP and the balance air reservoir ER. Because of this pressure difference, the balance discharge valve of the brake valve BV3 and the exhaust valve rod C of the relay valve RV3 becomes fully open and result in a large exhaust capacity. Then, when the brake valve BV3 is put in the lap position, the exhaustion of the balance air reservoir ER stops, and the pressure difference in the brake line BP of the locomotive and the balance air reservoir ER becomes smaller. Thus, the balance discharge valve and the exhaust valve rod C shift to the lap direction so that the exhaust capacity gradually becomes smaller. However, the brake line BP of the last car has not yet reached the specified point of exhaustion.

As explained above, despite the fact that the brake line BP of the car is still being exhausted, the brake line BP of the leading locomotive approaches a specified exhaustion and restricts the exhaust capacity. However, the large exhaust capacity cannot be maintained until the brake line BP of all of the cars is exhausted by a certain amount.

Therefore, in practicing this invention, the brake line of the locomotive is exhausted more than a specified value, that is, it appears to be over-exhausted while the exhaust capacity of the relay valve is kept large until the exhaustion of the brake line of the last railway car reaches a certain value. After that, the above-mentioned over-exhaustion is stopped. The method used in practicing the present invention may be described as follows:

First, a flow detector senses and detects the flow rate of the compressed air in the brake line of the locomotive. The flow detector is constructed so that when a normal braking command is given, the pilot chamber of the relay valve is supplemented by the over-exhaustion to accelerate the exhaustion of the brake line. Now, when the flow signal from the flow detector exceeds a predetermined value, the over-exhaustion is stopped. When the flow signal becomes lower than the predetermined value in an automatic air brake system, the brake lines of the railway cars are pressurized or exhausted by the relay valve of the locomotive.

Generally, in the railway cars of the train, when the normal braking command is given, the brake line of the locomotive is exhausted by a certain amount. However, the pressure in the brake line of the last car will still be relatively high due to the lag in the transmission time. While this pressure difference is large, the air flow in the brake line from the last car to the locomotive is relatively large. Now, as the brake line of the last car reaches a certain level of exhaustion, the pressure difference in the brake line of the locomotive and the last car becomes smaller. Thus, the air flow in the brake line into the locomotive becomes small, and the air flow in the brake line in the locomotive decreases. In this invention, the air flow in the brake line of the locomotive is detected, and an evaluation is made whether to pressurize the pilot chamber of the relay valve to a certain amount or to exhaust it by a specified amount.

First, if the air flow exceeds the predetermined value, in other words the brake line pressure of the last car remains high while the brake line pressure of the locomotive is exhausted by a certain amount, the pilot chamber of the relay valve is over-exhausted and, therefore, the exhaust capacity of the relay value is kept large and the exhaustion of the brake line of the last car is accelerated.

When the above-mentioned air flow becomes lower than a predetermined value, in other words, when the brake line of the last car approaches a specified amount of exhaustion, the over-exhaustion of the above-mentioned pilot chamber is stopped and returns to a specified exhaustion value. After that, it exhausts the brake line of all of the railway cars of the train by a certain amount.

The flow of air in the brake line of the locomotive which controls the above-mentioned over-exhaustion or a specified amount is proportional to the pressure difference in the brake line of the locomotive and the last railway vehicle so that in the case of a short train, the pressure difference is small. Thus, the air flow is small and quickly decreases. Accordingly, the time to over-exhaust the pilot chamber of the relay valve is short. Conversely, in the case of a long train, the pressure difference is large and the air flow is also large so that the pilot chamber of the relay valve remains in an over-exhaustion condition during that time.

In addition, the flow of air in the brake line of the locomotive, is proportional to a specified exhaustion value, namely, a normal brake command value, so that the specified exhaustion value is large. Now, when the exhaustion value becomes small, the specified exhaustion value is small. This corresponds to the flow of air so that the pilot chamber of the relay valve is over-exhausted or exhausted by a certain amount.

Therefore, according to this invention, the pilot chamber of the relay valve is over-exhausted until the brake line of the last car reaches a specified exhaustion value. In this manner, the exhaust capacity of the relay valve can be kept large so that the exhaustion of the brake line of the last car can be quickly accelerated. In addition, it automatically compensates for the difference in the number of railway cars or a specified exhaustion value, namely, normal brake command value. Therefore, it can accommodate each condition with the same type of control pattern so that a normal brake command acceleration effect corresponding to its status can be obtained.

BRIEF DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
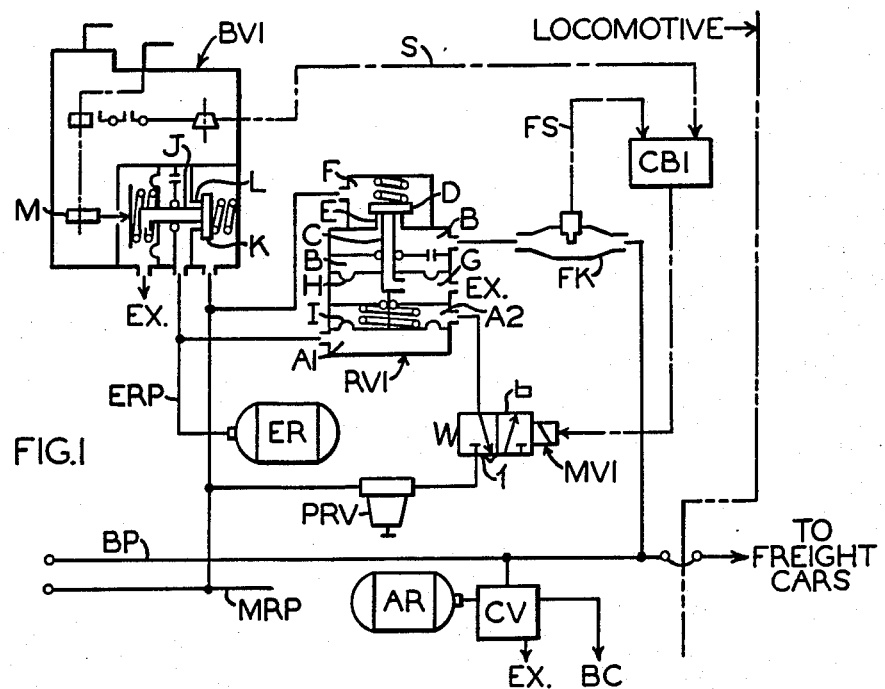
FIG. 1 is a schematic block diagram of one embodiment of an automatic brake control system for a railway train in accordance with the present invention.
Figure 7:
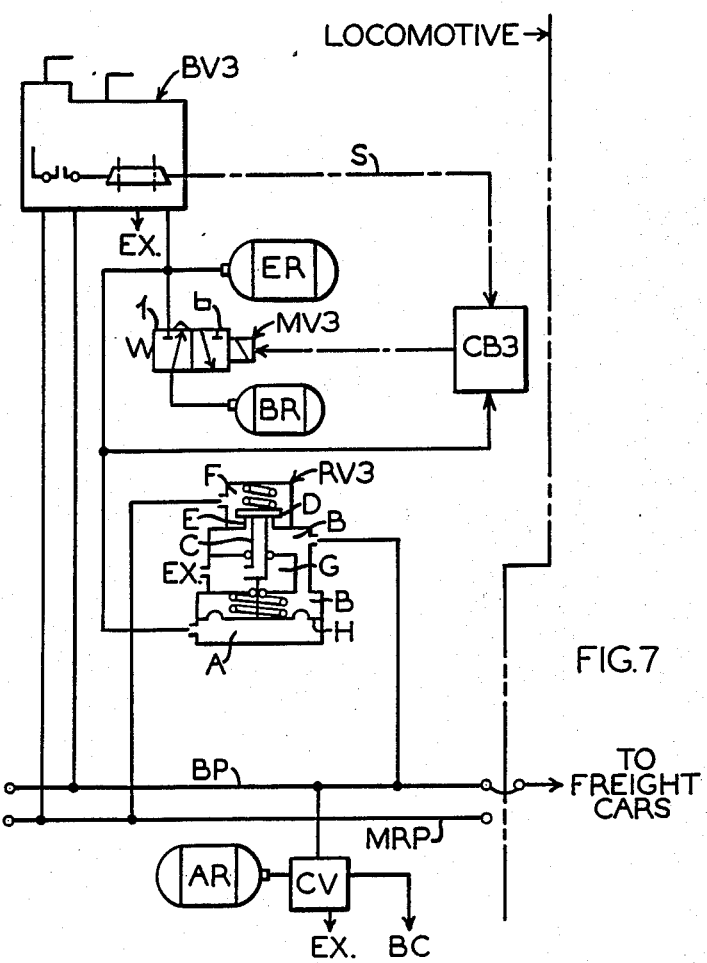

Referring now to the drawings, and in particular to FIG. 1, there is shown a schematic block diagram of one embodiment of the apparatus and interconnections of the railway brake control system in accordance with the present invention. Some of the parts or components which are structurally and functionally the same as those of the prior art system, shown in FIG. 7, are marked with the same symbols as in FIGS. 1 and 4. A more detailed explanation has been omitted for the purpose of convenience.

In viewing FIG. 1, it will be seen that when the brake valve BV1 is moved to the normal brake position, it exhausts the balance air reservoir ER to a corresponding operating level while at the same time, it switches the status signal S fed to the controller CB1 from 0 to 1.

The relay valve RV1 has a first pilot chamber A1 which is connected to the balance air reservoir ER and which is selectively pressurized or exhausted by the brake valve BV1. A second pilot chamber A2 works against the pressure in chamber A1 via a control piston or diaphragm I. The pilot pressure for the supplemental or compensating control is supplied or exhausted by the electromagnetic valve MV1, as will be described hereinafter.

A flow detector FK detects the air flow between the output chamber B of the relay valve RV1 and the brake line BP. The detector FK provides flow signal FS to an input of the controller CB1.

The electromagnetic valve MV1 is switched ON and OFF by the controller CB1 and is used for controlling the supplemental control. The electromagnetic valve MV1 has an exhaust position $\tau$ and an air supply position $\square$ and it employs the output pressure of the pressure regulation valve PRV as the pilot pressure for the supplemental control of the relay valve RV1.

Figure 2:
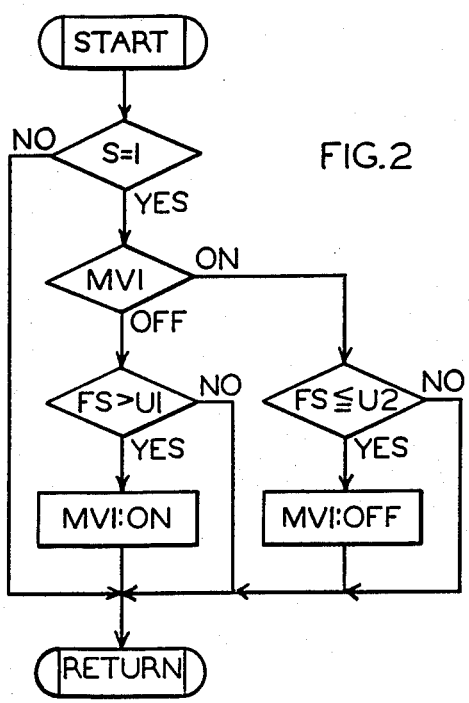
FIG. 2 is a flow chart showing the logic for controlling the braking operation of the system of FIG. 1.

The control flow chart states the status of the signal S, the electromagnetic valve MV1, and the flow signal FS for controlling the controller CB1, as indicated in FIG. 2 of the drawings.

In viewing FIG. 2, it will be noted that the braking system is shown in an operating condition in which the brakes are released.

At this time, the status signal S from the brake valve BV1 is equal to zero (0), and the air supply valve K is seated on the hollow exhaust valve rod J and is also seated on the air supply valve seat L so that the brake valve BV1 assumes a lap state. Thus, the balance air reservoir ER pressurizes the first pilot chamber A1 of the relay valve RV1 so that it is maintained at a certain pressure, e.g., 5 Kg/cm$^2$.

In addition, because the status signal S is equal to zero (0), the controller CB1 switches the electromagnetic valve MV1 to an OFF condition so that it assumes an exhaust position $\tau$. Thus, the second pilot chamber A2 of the relay valve RV1 is opened to the atmosphere. Therefore, the relay valve RV1 is also in a lap state in which the air supply valve D is seated on the hollow exhaust valve rod C and is also seated on the air supply valve seat E. Thus, the output chamber B is maintained at a specified pressure, namely, at the pressure of the brake line BP. At this time, the brake control valve CV of each railway car is exhausted so that all of the brake cylinders BC are released.

Figure 3:
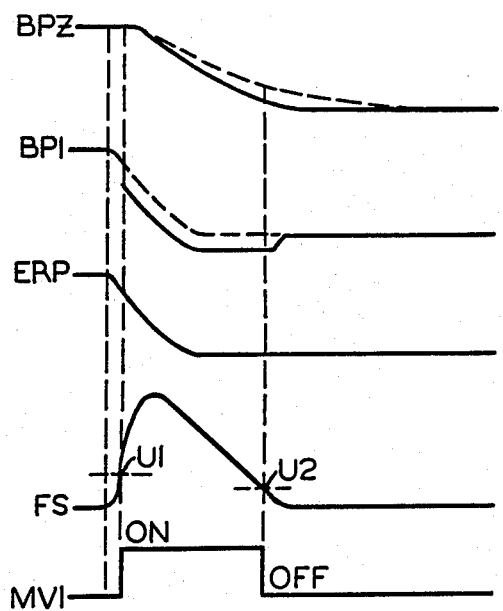
FIG. 3 is a graphic representation of the pressure responses of the brake pipes, balanced air reservoir, and flow signal, as well as the state of the electromagnetic valve of FIG. 1.

The operation during a normal braking of the first embodiment will be explained with reference to FIGS. 1 and 3. In viewing FIG. 3, it will be noted that the pressure ERP is the air pressure in the balance air reservoir ER, the pressure BP1 is the air pressure in the brake line BP of the locomotive, and the pressure BPZ is the air pressure in the brake line BP of the last railway car. In addition, as shown in FIGS. 2 and 3, the pressure point U1 is a first predetermined value of the flow signal FS while the pressure point U2 is the second predetermined value, wherein U1 > U2.

In the operating mode, as illustrated in FIG. 1, the brake valve BV1 is switched into its normal brake position. Thus, the force pushing the exhaust valve rod J by the cam plate M corresponds to the operational amount of the desired decrease in braking so that the exhaust valve rod J moves to the left, as shown in FIG. 1. Accordingly, the hollow exhaust rod J is unseated from valve K of the brake valve BV1. Consequently, the balance air reservoir ER begins to be exhausted through exhaust port EX.

Simultaneously, the first pilot chamber A1 of relay valve RV1 is also exhausted so that the exhaust valve rod C in the relay valve RV1 moves downwardly, as viewed in FIG. 1.

In the early state of exhaustion of the brake line BP, the pressure difference or differential pressure between the brake line of the locomotive and the last railway car is large so that the flow signal FS rapidly increases and quickly exceeds the first predetermined pressure value U1. In addition, since the status signal S is already equal to 1 at this time, the controller CB1 switches the electromagnetic valve to an ON condition and assumes the air supply position $\square$. Therefore, the second pilot chamber A2 of the relay valve RV1 is pressurized in the downward direction so that the total pilot pressure appears to be lower. Thus, the hollow exhaust rod C is further unseated so that the exhaust capacity becomes large. Therefore, the brake line BP of the locomotive is even more rapidly exhausted which, in turn, accelerates the exhaustion of the brake line BP of the last car.

Now, when the pressure of the balance air reservoir ER reaches the operating amount of the brake valve BV1, the force pushing the exhaust valve rod J toward the left becomes relatively small, and the hollow rod C becomes seated on the valve K so that the brake valve BV1 assumes the lap state, as shown in FIG. 1. At this point, the flow rate signal FS is still large, and the above-mentioned accelerated exhausting continues.

Now, since the exhaustion of the brake line BP of the last car is accelerated, the pressure differential between the brake line BP of the locomotive and the last car soon becomes relatively small. Thus, the flow rate signal FS drops below the second predetermined pressure valve U2 and the controller CB1 causes the electromagnetic valve MV1 to switch to its OFF position and it assumes again the exhaust position $\tau$ for exhausting pilot chamber A2. Accordingly, the total pilot pressure returns to normal and the relay valve RV1 returns to the lap state of FIG. 1.

After this, there is some air flow from the brake line BP of the last car to the locomotive for a little while. Then, the brake line BP of all of the cars reaches the same level of exhaustion and the amount of braking at this time is substantially the same on each railway car. Now, when the brake valve BV1 is returned to the release position for running operation, the brakes are released.

A second embodiment of the present invention will now be explained with reference to FIGS. 4 to 6.

Figure 4:
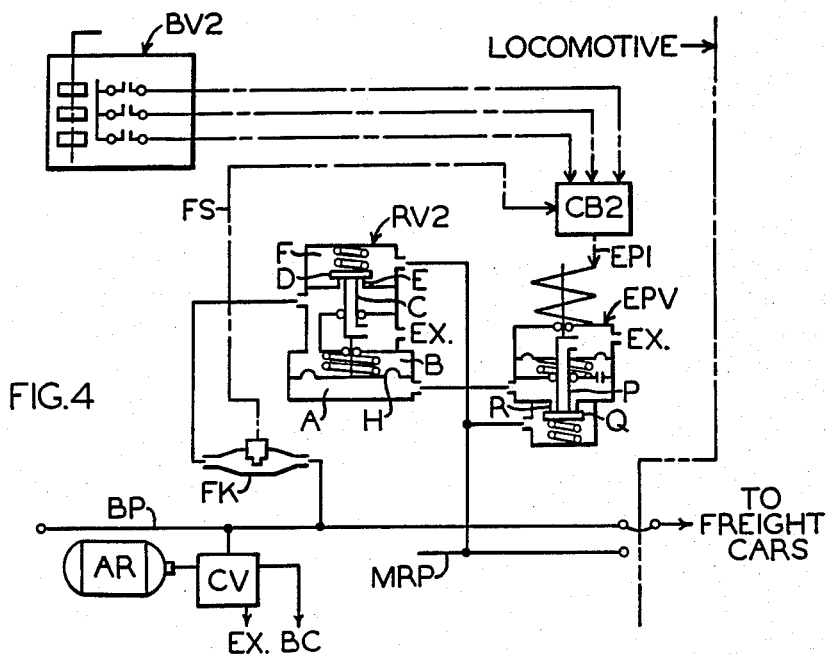
FIG. 4 is a schematic block diagram of another embodiment of an automatic brake control system for a railway train in accordance with the present invention.

In viewing FIG. 4, it will be noted that the brake controller BV2 is the normal brake and release commands. The commands consist of a 3 bit digital signal which represents the 1 to 7 notches or positions of the controller CB2.

Depending on the particular command produced by the brake controller BV2, the controller CB2 conveys a given command current EPI to the electropneumatic pressure conversion valve EPV. Normally, it switches the command current EPI to the standard pattern in the case of the standard braking command. In addition, the flow signal FS is below the second predetermined value U2 during the normal release command. In the case of the normal braking command, the flow signal FS exceeds the first predetermined value U1 so that the command current EPI is switched to a supplemental value or pattern OP which causes it to exhaust below the standard value STD.

The electropneumatic pressure conversion valve EPV controls the output pressure, namely, the air pressure in the pilot chamber A of the relay RV2 by the suction effect generated by the command current EPI.

Figure 5:
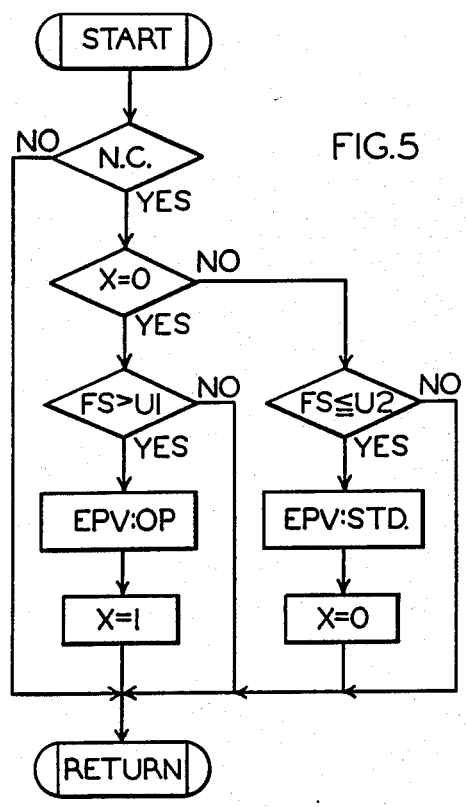
FIG. 5 is a flow chart showing the logic for controlling the braking operation of the system of FIG. 4.
Figure 6:
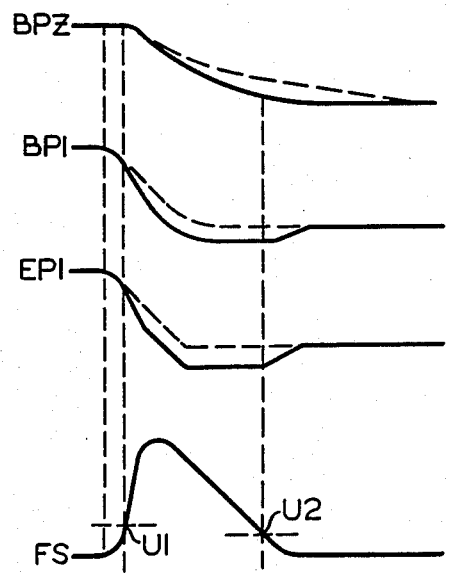
FIG. 6 is a graphic representation of the pressure versus time of the brake pipes, balanced air reservoir, and flow signal.

It will be noted that FIG. 5 illustrates the control flow chart of the controller CB2 in which a normal command NC is initially received from the START block.

In viewing FIG. 4, the system is shown in the running operational position in which the brake is released.

At this time, the command current EPI is at the maximum value, and the electropneumatic pressure conversion valve EPV is in the lap state in which the hollow exhaust valve rod P is seated on the air supply valve Q. The valve Q is also seated on the air supply valve seat R so that it maintains its output chamber, namely, the pilot chamber A of the relay valve RV2 at a certain pressure, e.g., 5 Kg/cm$^2$. Therefore, the relay valve RV2 maintains its output chamber B and the brake line BP at a certain pressure so that the brake cylinder BC of each car is released. In this running state, when the brake controller BV2 is operated for normal braking, the controller CB2 decreases the command current EPI in a standard pattern.

Since the command current EPI decreases, the suction action moves the exhaust valve rod P downwardly, as viewed in FIG. 4, then the exhaust valve rod P moves upwardly and opens its hollow portion so that it begins to exhaust the pilot chamber A of the relay valve RV2. Simultaneously, the relay valve RV2 exhausts and begins to exhaust the brake line BP.

In the early state of this brake operation, the pressure difference in the brake line BP of the locomotive and the last car is relatively large so that the flow signal FS rapidly increases and quickly exceeds the predetermined value U1. Thus, the controller CB2 decreases the command current EPI to a value even lower than the standard pattern. Therefore, the exhaust valve rod P of the electropneumatic pressure conversion valve EPV moves further upward, as shown in FIG. 4. Thus, the pilot chamber A of the relay valve RV2 supplements the movement.

Since the pilot chamber A is supplemented, the relay valve RV2 keeps the exhaust capacity large so that it supplements the brake line BP of the locomotive below a specified value. Thus, the exhaustion of the brake line BP of the last car is accelerated.

Now, when the brake line BP of the last car approaches a specified pressure, the flow signal FS decreases below the second predetermined value U2. Thus, the controller CB2 returns the command current EPI to the standard pattern. Accordingly, the output chamber of the electropneumatic pressure conversion valve EPV, namely, the pilot chamber A of the relay valve RV2 returns to a specified pressure.

After this, the air flow in the brake line BP from the last car to the locomotive remains the same for a while, and then, the brake line or pipe BP of all of the cars reaches a specified pressure corresponding to the normal brake command. Thus, the braking action on each car remains the same.

If the brake controller BV2 is returned to the released or running position, it returns to the state as shown in FIG. 4. Although the command from the brake controller BV2 of FIG. 4 is a digital signal, it can also be an analog signal.

In addition, it is possible to introduce a normal brake command from the automatic train control ATC or ATS into the controllers CB1, CB2 in either of the two embodiments and to use this as a supplemental factor.

In addition, the predetermined value of the flow signal FS is the first predetermined value U1 and it is different from the second predetermined value U2. However, they can also be the same value.

In the first embodiment shown in FIG. 1, the supplemental command is based on the ON and OFF control conditions of the electromagnetic valve MV1 so that the combined pilot pressure of the relay valve RV1 changes in a step fashion. Therefore, if the amount of the supplemental command is large, it is possible that the pressure in the brake line BP decreases in steps when the electromagnetic valve MV1 is turned ON. When there is a rapid operation of the brake control valve CV, the step decrease in the amount of the pressure in the brake line BP may become greater than the operational sensitivity of the rapid action valve, which is dangerous since it might induce an emergency braking. In addition, it is possible that the pressure in the brake line BP increases in steps when the electromagnetic valve MV1 is turned OFF, and if the brake control valve CV is a two-pressure type control valve, the brake cylinder BC of the car in the front position might be released, which is also dangerous. Therefore, the supplemental amount should not be set to be too large in the first embodiment.

On the other hand, in the second embodiment, the pilot pressure of the relay valve RV2 can be controlled in an analog manner by the electropneumatic pressure conversion valve EPV so that the pressure in the brake line BP can be changed continuously by operating the ON and OFF conditions of the supplemental command.

Therefore, in the second embodiment, the supplemental amount can be set relatively larger than in the first embodiment, and the normal braking accelerating effect can be further improved.

The following is a listing of the components shown in the drawings and described in the specification:

| | |
|---|---|
| AR | supplemental air reservoir |
| BV1, BV2, BV3 | brake valves |
| RV1, RV2, RV3 | relay valves |
| BP | brake line |
| FK | flow rate detector |
| CV | brake control valve |
| A, A1, A2 | pilot chambers |
| B | output chamber |
| FS | flow signal |
| U1, U2 | predetermined pressure values |
| CB1, CB2, CB3 | controllers |
| MV1, MV3 | electromagnetic valve |
| EPV | electropneumatic pressure conversion valve |
| PRV | pressure regulating valve |
| S | status signal |
| C, J, P | exhaust valve rods |
| D, K, Q | air supply valves |
| E, L, R | air supply valve seats |
| F | air supply chamber |
| G | exhaust chamber |
| H | balance piston |
| I | diaphragm |
| ER | balance air reservoir |
| BR | expansion air reservoir |
| BP1, BPZ, ERP | pressures |
| EPI | command current |
| STD | standard value |
| OP | supplemental value |
| NC | normal command |
| EX | exhaust opening |
| MRP | air reservoir line |
| 1,b | valve positions |
| BC | brake cylinder |

Thus, the present invention has been described in such full, clear, concise, and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents, and substitutions for components for the above specifically-described embodiments of the invention may be made by those persons skilled in the art without departing from the spirit and scope of the invention as set forth in the appended claims.

I claim:

1. An automatic brake control system for a railway train comprising, a brake line running the length of the train, a brake valve located in the locomotive for allowing a brake application and a brake release, a relay valve having output and pilot chambers, a flow rate detector disposed between the brake line and the output chamber, a controller receiving a digital signal from the brake valve and a flow signal from the flow rate detector, an electropneumatic conversion valve controlled by the controller to exhaust the pilot chamber to accelerate the exhaustion of the brake line during a brake application.

2. The automatic brake control system, as defined in claim 1, wherein the relay valve includes a supply, an exhaust, and a lap position.

3. The automatic brake control system, as defined in claim 1, wherein the electropneumatic conversion valve is exhausted during a brake release.

4. The automatic brake control system, as defined in claim 1, wherein the relay valve includes a hollow exhaust rod which is opened wider to more quickly exhaust the brake line.

5. The automatic brake control system, as defined in claim 1, wherein the relay valve includes a hollow exhaust rod which is further unseated from a valve to accelerate exhaustion of the brake line of the last car of the train.

6. The automatic brake control system, as defined in claim 1, wherein the digital signal is a 3 bit command.

7. The automatic brake control system, as defined in claim 1, wherein the electropneumatic conversion valve is controlled by command current from the controller.

* * * * *